United States Patent
Harper et al.

(10) Patent No.: US 8,408,646 B2
(45) Date of Patent: Apr. 2, 2013

(54) SEAT CUSHION EXTENSION MECHANISM

(75) Inventors: Kendrick Alden Harper, Temperance, MI (US); Mark Damien Jessup, Garden City, MI (US); Jerry R. Brown, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 338 days.

(21) Appl. No.: 12/756,239

(22) Filed: Apr. 8, 2010

(65) Prior Publication Data
US 2011/0248538 A1 Oct. 13, 2011

(51) Int. Cl.
A47C 7/14 (2006.01)
A47C 3/00 (2006.01)

(52) U.S. Cl. .................................. 297/284.11

(58) Field of Classification Search ............ 297/284.11, 297/284.1, 330, 337, 463.1, 463.2; 29/428
See application file for complete search history.

(56) References Cited

U.S. PATENT DOCUMENTS

| | | | |
|---|---|---|---|
| 3,235,308 A * | 2/1966 | Conner ........................ 297/337 |
| 3,848,845 A | 11/1974 | Bogart |
| 4,324,431 A | 4/1982 | Murphy et al. |
| 4,334,709 A | 6/1982 | Akiyama et al. |
| 4,915,447 A | 4/1990 | Shovar |
| 5,171,062 A | 12/1992 | Courtois |
| 5,362,128 A * | 11/1994 | Wildern, IV ............ 297/284.11 |
| 5,366,272 A | 11/1994 | Lebrun |
| 5,607,204 A | 3/1997 | Gryp |
| 5,622,406 A | 4/1997 | Meschkat et al. |
| 5,733,005 A | 3/1998 | Aufrere et al. |
| 5,908,220 A | 6/1999 | Bauer et al. |
| 6,053,575 A | 4/2000 | Bauer et al. |
| 6,106,063 A | 8/2000 | Dauphin |
| 6,109,693 A | 8/2000 | Bauer et al. |
| 6,189,971 B1 | 2/2001 | Witzig |
| 6,375,261 B1 | 4/2002 | Link |
| 6,386,633 B1 | 5/2002 | Newton |
| 6,402,245 B1 | 6/2002 | Newton et al. |
| 6,419,317 B1 | 7/2002 | Westrich et al. |
| 6,428,102 B1 | 8/2002 | Becker et al. |
| 6,454,353 B1 * | 9/2002 | Knaus ...................... 297/284.11 |
| 6,601,918 B2 | 8/2003 | Mattsson |
| 6,814,406 B2 | 11/2004 | Ito et al. |
| 7,108,322 B2 * | 9/2006 | Erker ...................... 297/284.11 |
| 7,192,087 B2 | 3/2007 | Adragna et al. |
| 7,571,964 B2 | 8/2009 | Taniguchi et al. |
| 7,578,554 B2 | 8/2009 | Lee et al. |
| 7,597,398 B2 * | 10/2009 | Lindsay .................. 297/284.11 |
| 7,669,928 B2 * | 3/2010 | Snyder .................... 297/284.11 |
| 7,669,929 B2 * | 3/2010 | Simon et al. ............ 297/284.11 |
| 7,997,648 B2 * | 8/2011 | Becker et al. ........... 297/284.11 |
| 2007/0090673 A1 | 4/2007 | Ito |

(Continued)

Primary Examiner — Milton Nelson, Jr.
(74) Attorney, Agent, or Firm — Vichit Chea; Price Heneveld LLP

(57) ABSTRACT

A seat assembly having a seat base. A seat pan is operably connected to the seat base. A rod extends across the seat base into elongated slots in the seat pan. An engagement member is operable between a first position out of contact with the rod and a second position in contact with the rod. A motor includes a drive shaft operably connected with the rod and adapted to rotate the rod. Rotation of the drive shaft when the engagement member is in the first position causes longitudinal displacement of the seat pan. Rotation of the drive shaft when the engagement member is in the second position causes rotation of the rod and the seat pan.

20 Claims, 5 Drawing Sheets

U.S. PATENT DOCUMENTS

| | | |
|---|---|---|
| 2007/0132293 A1 | 6/2007 | Moriyama et al. |
| 2008/0231099 A1 | 9/2008 | Szczepkowski et al. |
| 2009/0091172 A1* | 4/2009 | Kim ............................ 297/337 |
| 2009/0152920 A1* | 6/2009 | Gumbrich et al. ......... 297/284.1 |
| 2009/0174242 A1 | 7/2009 | Kohl et al. |
| 2009/0200848 A1 | 8/2009 | Kubler et al. |
| 2009/0206643 A1 | 8/2009 | Yamamoto |
| 2009/0212611 A1 | 8/2009 | Gloriosa |

* cited by examiner

SEAT CUSHION EXTENSION MECHANISM

FIELD OF THE INVENTION

The present invention generally relates to a seat cushion extension mechanism, and more particularly relates to a seat cushion extension mechanism that also is pivotally rotatable to provide additional support to the legs of a user.

BACKGROUND OF THE PRESENT INVENTION

Seat cushion extension mechanisms are often designed to provide support to the back of the legs of a user, but often have vertical adjustment constraints.

SUMMARY OF THE PRESENT INVENTION

One aspect of the present invention includes a seat assembly having a seat base. A seat pan is operably connected to the seat base. A rod extends across the seat base into elongated slots in the seat pan. An engagement member is operable between a first position out of contact with the rod and a second position in contact with the rod. A motor is provided that includes a drive shaft operably connected with the rod and adapted to rotate the rod. Rotation of the drive shaft when the engagement member is in the first position causes longitudinal displacement of the seat pan. Rotation of the drive shaft when the engagement member is in the second position causes rotation of the rod and the seat pan.

Another aspect of the present invention includes a seat assembly having a seat pan disposed on a seat base and operably connected with a rod. An engagement member is operable between engaged and disengaged positions with the rod. A motor is adapted to rotate the rod. Rotation of the rod moves the seat pan longitudinally when the engagement member is disengaged. Rotation of the rod pivots the seat pan about the rod when the engagement member is engaged.

Yet another aspect of the present invention includes a method for making a seat assembly. A seat pan is operably connected to a seat base. A rod is operably connected with the seat pan and an engagement member is positioned adjacent to the rod. The engagement member is operable between an engaged position and a disengaged position. The rod is connected with a motor adapted to rotate the rod. Rotation of the rod when the engagement member is in the disengaged position causes longitudinally displacement of the seat pan. Rotation of the rod when the engagement member is in the engaged position causes rotation of the seat pan.

These and other aspects, objects, and features of the present invention will be understood and appreciated by those skilled in the art upon studying the following specification, claims, and appended drawings.

DETAILED DESCRIPTION OF EMBODIMENTS

Figure 1:
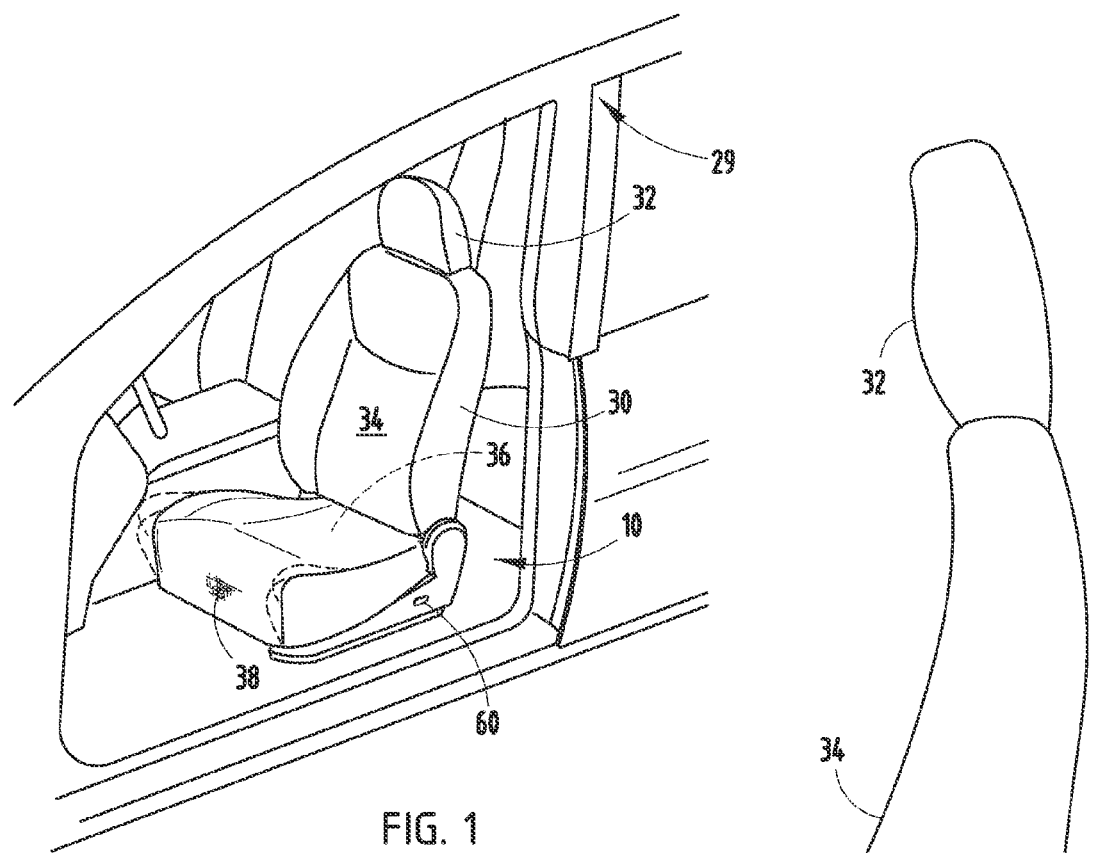
FIG. 1 is a top perspective view of one embodiment of a seat incorporating one embodiment of a vertically-rotating seat extension mechanism.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
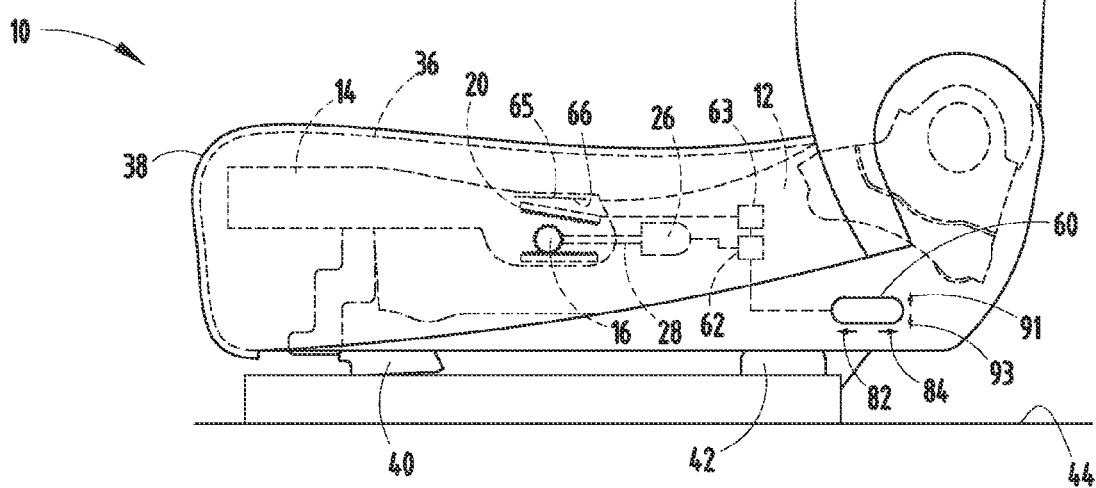
FIG. 2 is a side elevational view of the seat of FIG. 1.

Referring to FIGS. 1 and 2, the reference numeral 10 generally designates a seat assembly having a seat base 12. A seat pan 14 is operably connected to the seat base 12. A rod 16 extends across the seat base 12 into elongated slots 18 in the seat pan 14. An engagement member 20 is operable between a first position 22 out of contact with the rod 16 and a second position 24 in contact with the rod 16. A motor 26 includes a drive shaft 28 operably connected with the rod 16 and adapted to rotate the rod 16. Rotation of the drive shaft 28 when the engagement member 20 is in the first position 22 causes longitudinal displacement of the seat pan 14. Clockwise rotation of the drive shaft 28 when the engagement member 20 is in the second position 24 causes clockwise rotation of the rod 16 and the seat pan 14.

Referring again to the embodiment illustrated in FIGS. 1 and 2, the seat assembly 10 is generally designed for use in a vehicle 29 and includes a seat back 30 with a head rest 32 and a body portion 34 adapted to recline to a variety of angles relative to the seat base 12. A cushion 36 extends over the seat pan 14 and seat base 12 and is designed to provide support to the underside of the legs of a user. A pliable fabric 38 is positioned over the cushion 36 to protect the cushion 36 and provide an aesthetic appearance. The cushion 36 is flexible and allows for movement of the seat pan 14 relative to the seat base 12 without damaging the cushion 36 or the fabric 38 disposed on the cushion 36. The seat assembly 10 is supported on forward and rearward legs 40, 42. The forward and rearward legs 40, 42 are fixedly attached by fasteners to a floor 44 of the vehicle 29 and to the seat assembly 10. Accordingly, when the seat assembly 10 moves forward or rearward, the seat assembly 10 moves relative to the forward and rearward legs 40, 42.

Figure 3:
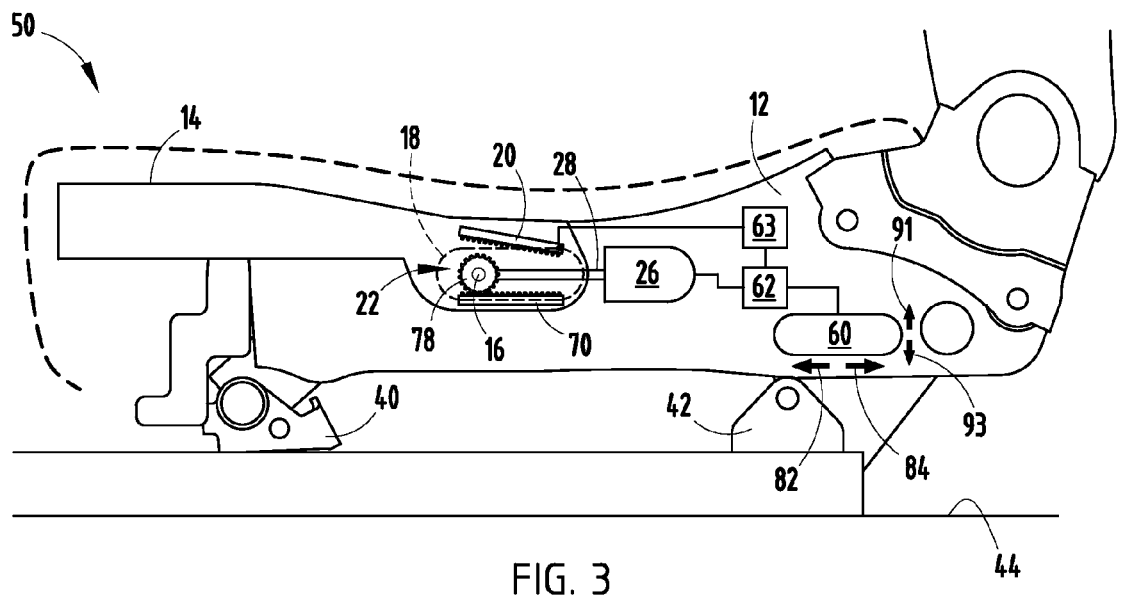
FIG. 3 is a side elevational view of one embodiment of a seat extension mechanism in a non-extended position.
Figure 4:
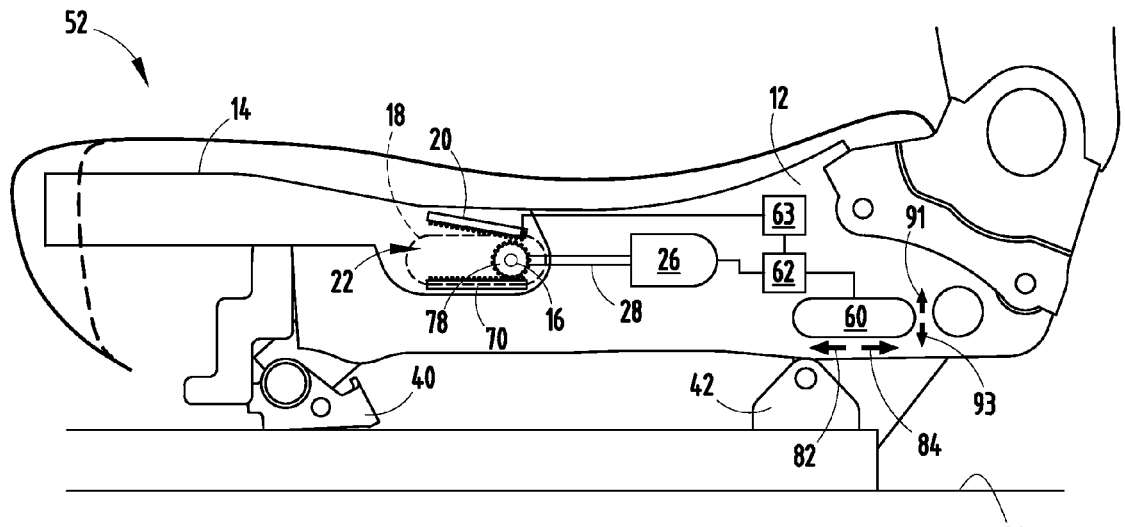
FIG. 4 is a side elevational view of the seat extension mechanism in an extended position.

Referring to FIG. 2, the seat pan 14 of the seat assembly 10 is generally moveable longitudinally forward and rearward between a fully retracted position 50 (FIG. 3) and a fully extended position 52 (FIG. 4). The seat assembly 10 is also pivotally moveable up and down between a fully lowered position 54 (FIG. 5) and a fully raised position 56 (FIG. 6). More specifically, the seat assembly 10 is designed to extend forward such that adequate support can be provided below the legs of a user. Further, the seat assembly 10 is upwardly pivotal to provide vertical support to the underside of the legs of a user. In addition, the seat assembly 10 is adjustable to any of a variety of positions between the fully retracted position 50 and the fully extended position 52 and between the fully lowered position 54 and the fully raised position 56.

Referring again to FIG. 2, a toggle switch 60 is operably connected with a controller 62 (FIG. 4) that regulates the motor 26. The toggle switch 60 receives directional instructions from a user and forwards those instructions to the controller 62, which activates and controls the motor 26. The controller 62 also activates a solenoid 63 adapted to raise and lower the engagement member 20, as discussed in further detail below. For example, in the event the user pushes the toggle switch 60 in a forward direction, the seat pan 14 moves longitudinally fore and aft relative to the seat base 12 to elongate the seat assembly 10. As another example, when a user pushes the toggle switch 60 upward, the seat pan 14 rotates relative to the seat base 12 to provide support to the underside of a user's legs. Further, longitudinal channels 65, 66 may be positioned on one of the seat pan 14 and the seat base 12, respectively, to facilitate longitudinal movement of the seat pan 14. Details with respect to how the seat assembly 10 moves upwardly and longitudinally are provided in further detail below.

Figure 3A:
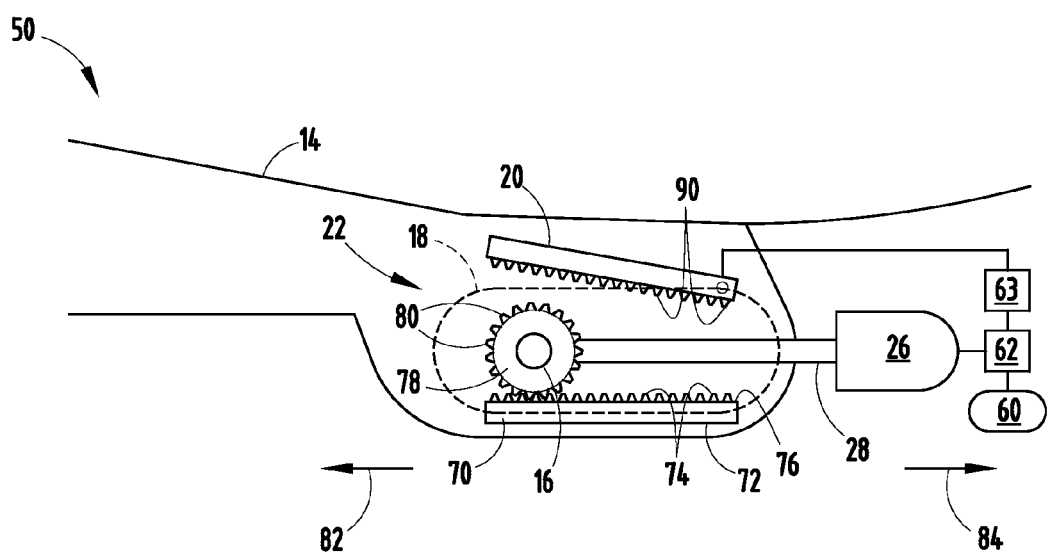
FIG. 3A is an enlarged elevational view of the motor and drive shaft of FIG. 3.

Referring now to FIGS. 3 and 3A, the illustrated embodiment depicts the seat assembly 10 in the fully retracted position 50. In this position, the operable seat length is at its shortest. That is, the available surface area of the seat assembly 10 that is available to support a user is minimized. When the seat assembly 10 is in the fully retracted position 50, the rod 16 is positioned over a forward end 70 of a base engagement member 72. The base engagement member 72 has a generally planar construction with a plurality of teeth 74 disposed in a top side 76 thereof. The rod 16 extends through and is connected with a gear 78 that has a plurality of teeth 80 adapted to engage the teeth 74 on the base engagement member 72.

Figure 4A:
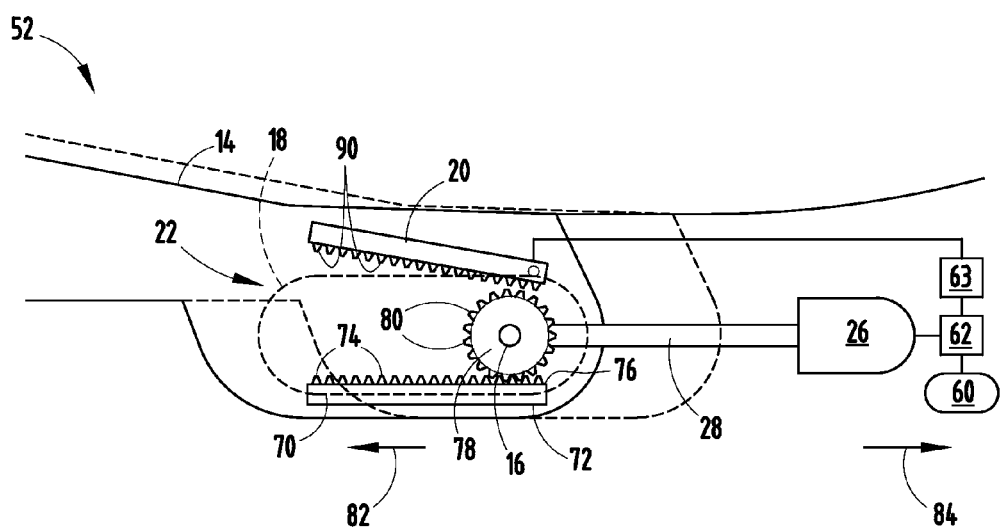
FIG. 4A is an enlarged elevational view of the motor and drive shaft of FIG. 4.

Referring to FIGS. 4 and 4A, movement of the toggle switch 60 in the direction of forwardly pointed arrow 82 causes the controller 62 to activate the motor 26, which consequently rotates the drive shaft 28, and therefore the rod 16 in a clockwise fashion. When the rod 16 rotates in a clockwise fashion, the teeth 80 of the gear 78 act on and push the teeth 74 of the base engagement member 72 in a forward direction denoted by arrow 82. As the base engagement member 72 is urged forward, so is the seat pan 14, which is fixedly connected to the base engagement member 72. When the seat pan 14 reaches the fully extended position 52, the gear 78 is at the rearward end of the base engagement member 72, the controller 62 deactivates the motor 26, leaving the seat pan 14 at the fully extended position 52. To return to the fully retracted position 50, the user pushes the toggle switch 60 in the direction of rearwardly pointed arrow 84. Movement of the toggle switch 60 in the direction of rearwardly pointed arrow 84 causes the controller 62 to activate the motor 26 which consequently rotates the drive shaft 28 in an opposite direction than when the toggle switch 60 is pushed in the direction of forwardly pointed arrow 82. The rod 16 consequently rotates in a counterclockwise fashion. When the rod 16 rotates in a counterclockwise fashion, the teeth 80 of the gear 78 act on and push the teeth 74 of the base engagement member 72 in a rearward direction denoted by arrow 84. As the base engagement member 72 is urged rearward, so is the seat pan 14, which is fixedly connected to the base engagement member 72. When the seat pan 14 reaches the fully retracted position 50, the gear 78 is at the forward end of the base engagement member 72 (FIGS. 3 and 3A). At the same time, the controller 62 deactivates the motor 26, leaving the seat pan 14 at the fully retracted position 50.

Figure 5:
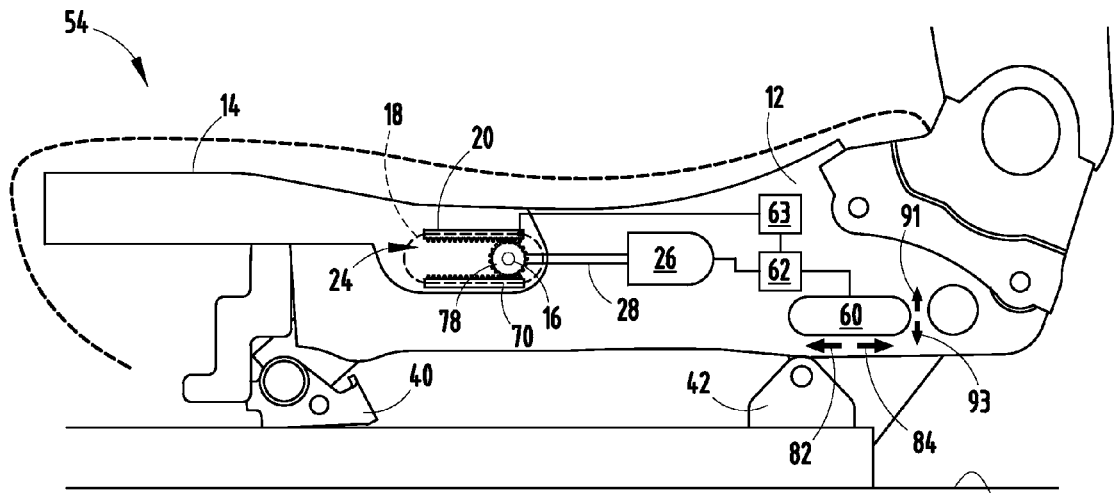
FIG. 5 is a side elevational view of the seat extension mechanism in a lowered position.
Figure 5A:
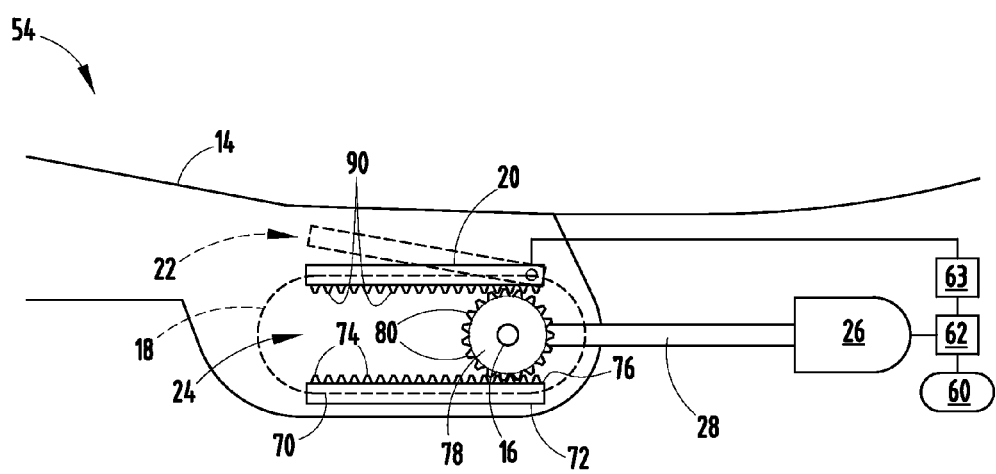
FIG. 5A is an enlarged elevational view of the motor and drive shaft of FIG. 5.
Figure 6:
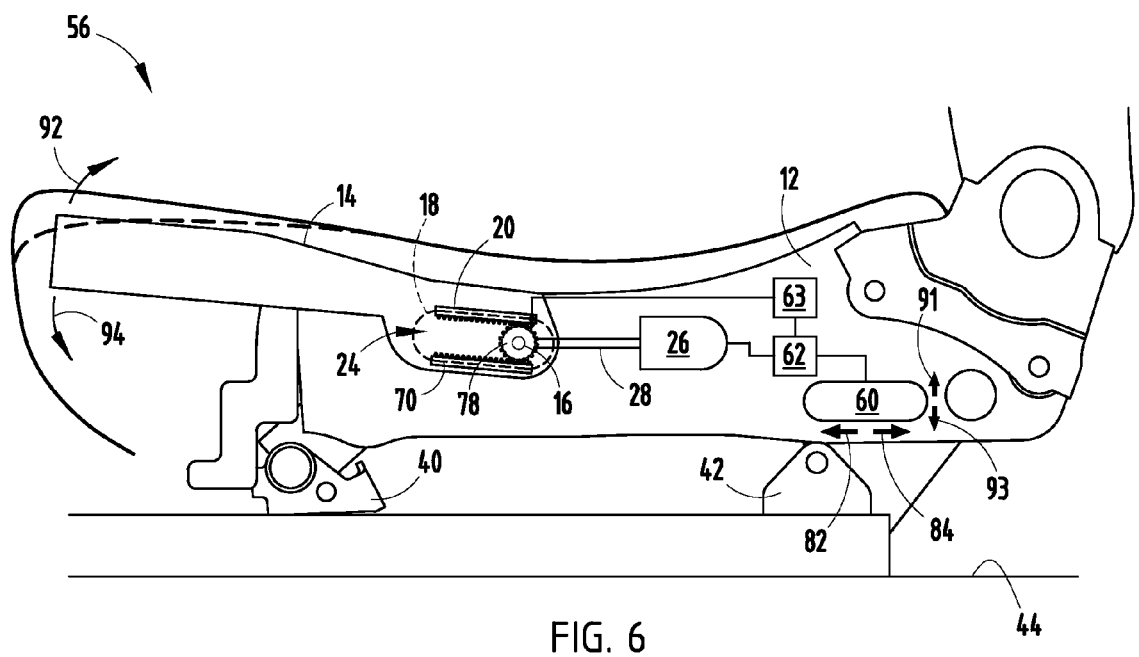
FIG. 6 is a side elevational view of the seat extension mechanism in a raised position.

Referring now to FIGS. 5 and 5A, the illustrated embodiment shows the engagement member 20 in the second position 24. Pushing the toggle switch 60 upward sends a signal to the controller 62 to activate the solenoid 63, which pivotally rotates the engagement member 20 downward into the second position 24. When the solenoid 63 causes the engagement member 20 to pivotally rotate downward into the second position 24, teeth 90 of the engagement member 20 engage the teeth 80 on the gear 78, which is connected to the rod 16. Pushing the toggle switch 60 upward in the direction shown by arrow 91 also causes the motor 26 to activate and rotate the drive shaft 28, which consequently rotates the rod 16 and the gear 78. When the gear 78 rotates, the gear 78 no longer longitudinally displaces or moves the seat pan 14 relative to the seat base 12, but rather rotates the seat pan 14 about the rod 16 in the direction of arrow 92. More specifically, the gear 78 cannot move the seat pan 14 forward or rearward relative to the base 12 because the teeth 90 of the engagement member 20 prevent the gear 78 from moving longitudinally relative to the base engagement member 72. Accordingly, when the gear 78 rotates, the engagement member 20 and the base engagement member 72 rotate with the gear 78 as a single unit, which consequently rotates the seat pan 14 toward the fully raised position 56.

Figure 6A:
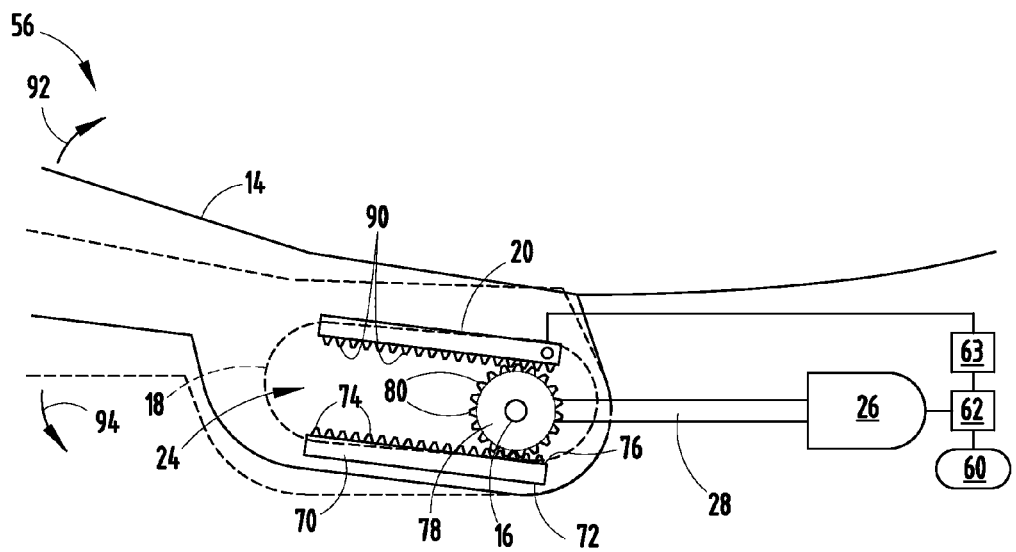
FIG. 6A is an enlarged elevational view of the motor and drive shaft of FIG. 6.

Referring now to the embodiment illustrated in FIGS. 6 and 6A, when the gear 78 has rotated clockwise, the seat pan 14 also rotates clockwise in the direction of arrow 92 to the fully raised position 56. In the event a user wishes to lower the seat pan 14 to the fully lowered position 54, the user simply pushes the toggle switch 60 downward in the direction of arrow 93, which causes the controller 62 to send a signal to the motor 26, which rotates the drive shaft 28 in an opposing direction, which consequently rotates the gear 78 in a counterclockwise direction, thereby rotating the seat pan 14 downward in the direction of arrow 94. To extend or retract the seat pan 14, the user then pushes the toggle switch 60 forward or rearward, which first activates the solenoid 63, thereby causing the engagement member 20 to pivotally rotate upward. The controller 62 then sends a signal to the motor 26 to rotate the rod 16 to move the seat pan 14 forward or rearward, as described in detail above.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat assembly, comprising:
   a seat base;
   a seat pan operably connected to the seat base;
   a rod extending across the seat base into elongated slots in the seat pan;
   an engagement member operable between a first position out of contact with the rod and a second position in contact with the rod; and
   a motor including a drive shaft operably connected with the rod and adapted to rotate the rod, wherein rotation of the drive shaft when the engagement member is in the first position causes displacement of the seat pan in one of a forward and rearward direction and wherein rotation of the drive shaft when the engagement member is in the second position causes rotation of the rod and consequently, the seat pan.

2. The seat assembly of claim 1, wherein the engagement member pivotally rotates relative to the seat assembly into the first position and the second position.

3. The seat assembly of claim 1, comprising:
longitudinal channels disposed on one of the seat pan and the seat base.

4. The seat assembly of claim 1, wherein the rod includes first and second ends, and wherein each of the first and second ends includes a gear assembly.

5. The seat assembly of claim 4, wherein the engagement member includes a plurality of teeth adapted to engage the gear assembly.

6. The seat assembly of claim 1, wherein the seat pan includes side flanges that extend over side portions of the seat base.

7. The seat assembly of claim 1, wherein the seat pan is positionable between a fully extended position and a fully retracted position, and wherein the seat pan is pivotal about the rod when the seat pan is in the fully extended position and the fully retracted position.

8. A seat assembly, comprising:
a seat pan disposed on a seat base and operably connected with a rod;
an engagement member operable between engaged and disengaged positions with the rod; and
a motor adapted to rotate the rod, wherein rotation of the rod moves the seat pan longitudinally when the engagement member is disengaged, and wherein rotation of the rod pivots the seat pan about the rod when the engagement member is engaged.

9. The seat assembly of claim 8, wherein the engagement member is pivotally connected to the seat assembly.

10. The seat assembly of claim 8, comprising:
channels disposed on one of the seat pan and the seat base.

11. The seat assembly of claim 8, wherein the seat pan includes side flanges that extend over side portions of the seat base.

12. The seat assembly of claim 8, wherein the rod includes first and second ends, and wherein each of the first and second ends includes a gear assembly.

13. The seat assembly of claim 12, wherein the engagement member includes a plurality of teeth adapted to engage the gear assembly.

14. The seat assembly of claim 8, wherein the seat pan is positionable between a fully extended position and a fully retracted position, and wherein the seat pan is pivotal about the rod when the seat pan is in the fully extended position and the fully retracted position.

15. A method of making a seat assembly, comprising:
operably connecting a seat pan to a seat base;
operably connecting a rod with the seat pan;
positioning an engagement member adjacent to the rod, wherein the engagement member is operable between an engaged position and a disengaged position; and
connecting the rod with a motor adapted to rotate the rod, wherein rotation of the rod when the engagement member is in the disengaged position causes longitudinal displacement of the seat pan and wherein rotation of the rod when the engagement member is in the engaged position causes rotation of the seat pan.

16. The method of claim 15, further comprising:
positioning channels on one of the seat pan and the seat base.

17. The method of claim 15, further comprising:
positioning a gear with teeth on the rod.

18. The method of claim 17, further comprising:
forming teeth on the engagement member that are adapted for engagement with the teeth on the gear.

19. The method of claim 15, wherein the rod includes first and second ends, and wherein each of the first and second ends includes a gear assembly.

20. The method of claim 19, wherein the engagement member includes a plurality of teeth adapted to engage the gear assembly.

* * * * *